US012754974B2

(12) United States Patent
Pleli et al.

(10) Patent No.: US 12,754,974 B2
(45) Date of Patent: Oct. 6, 2026

(54) COMPUTER-IMPLEMENTED METHOD AND SYSTEM FOR OPTIMIZING A CLUSTERING OF A PLURALITY OF INPUT DATA

(71) Applicant: Robert Bosch GmbH, Stuttgart (DE)

(72) Inventors: Alina Pleli, Tuebingen (DE); Simon Baeuerle, Tuebingen (DE); Jonas Barth, Nehren (DE); Michel Janus, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 19/053,047

(22) Filed: Feb. 13, 2025

(65) Prior Publication Data

US 2025/0284775 A1 Sep. 11, 2025

(30) Foreign Application Priority Data

Mar. 5, 2024 (DE) ..................... 10 2024 202 027.3

(51) Int. Cl.
*G06F 18/23* (2023.01)
*G06F 18/2321* (2023.01)

(52) U.S. Cl.
CPC ................................ *G06F 18/2321* (2023.01)

(58) Field of Classification Search
CPC ................................................... G06F 18/2321
See application file for complete search history.

(56) References Cited

U.S. PATENT DOCUMENTS 9,064,161 B1 * 6/2015 Boman .................. G06V 20/40
9,886,945 B1 * 2/2018 Sieracki .................. G10L 15/08
11,816,593 B2 * 11/2023 Karlinsky ............ G06V 10/762
11,972,296 B1 * 4/2024 Smith ................... G06F 9/5027
12,147,453 B1 * 11/2024 Smith ................... G06F 16/287
12,632,675 B2 * 5/2026 Frick ....................... G06F 40/40
2011/0091113 A1 * 4/2011 Ito ........................ G06V 40/165
382/197

(Continued)

OTHER PUBLICATIONS

Guerin et al., "CNN features are also great at unsupervised classification," Computer Science & Information Technology (CS & IT), 2018, pp. 83-95. https://airccj.org/CSCP/vol8/csit88308.pdf Downloaded Feb. 13, 2025.

(Continued)

*Primary Examiner* — Merilyn P Nguyen
(74) *Attorney, Agent, or Firm* — Norton Rose Fulbright US LLP

(57) ABSTRACT

A computer-implemented method and system for optimizing a clustering of a plurality of input data. The method includes: providing a plurality of input data of a manufacturing component to be inspected; extracting at least one feature from the plurality of input data by applying an extraction algorithm; clustering the plurality of input data on the basis of the at least one feature by applying a clustering algorithm; evaluating clusters of the clustered plurality of input data by applying a cluster evaluation algorithm; sorting out, from the plurality of input data, input data that are assigned to at least one cluster with a high rating and/or that exceed a predetermined limit number of input data within the at least one cluster with the high rating; and repeating iteratively certain steps until the plurality of input data is completely clustered and/or evaluated, and/or until a predetermined termination criterion is reached.

12 Claims, 2 Drawing Sheets

(56) References Cited

U.S. PATENT DOCUMENTS

| | | | | |
|---|---|---|---|---|
| 2016/0187199 | A1* | 6/2016 | Brunk | G01J 3/0208 348/89 |
| 2018/0060649 | A1* | 3/2018 | Kastaniotis | G06F 18/214 |
| 2020/0125234 | A1* | 4/2020 | Lee | G06F 18/21 |
| 2020/0272857 | A1* | 8/2020 | Arcot Desai | G06N 3/096 |
| 2020/0285890 | A1* | 9/2020 | Fuchs | G06F 18/214 |
| 2021/0342570 | A1* | 11/2021 | Gregson | G06V 10/764 |
| 2021/0342643 | A1* | 11/2021 | Bai | G06V 10/7747 |
| 2024/0161475 | A1* | 5/2024 | Vadarevu | G06T 11/26 |
| 2024/0362735 | A1* | 10/2024 | Lombard | G06Q 10/0635 |
| 2024/0411724 | A1* | 12/2024 | Nagarajan | G06F 16/1748 |
| 2025/0106369 | A1* | 3/2025 | Liu | G06V 10/7715 |
| 2025/0191680 | A1* | 6/2025 | Boutet | G06T 7/0012 |

OTHER PUBLICATIONS

Napoletano et al., "Anomaly detection in nanofibrous materials by CNN-based self-similarity," Sensors, MDPI, vol. 18, No. 1, 2018, pp. 1-15. https://sci-hub.ru/10.3390/s18010209 Downloaded Feb. 13, 2025.

Doan et al., "Scene image clustering based on boosting and gmm," Proceedings of the Second Symposium on Information and Communication Technology, SolCT 2011, Association for Computing Machinery, 2011, pp. 226-232. https://sci-hub.ru/10.1145/2069216.2069258 Downloaded Feb. 13, 2025.

Baek and Kim: "Contrastive deep clustering for detecting new defect patterns in wafer bin maps.," The International Journal of Advanced Manufacturing Technology, 130 (2024), pp. 3561-3571, Springer.

Koo and Hwang: "A Unified Defect Pattern Analysis of Wafer Maps Using Density-Based Clustering," IEEE Access 9 (2021), pp. 78873-78882.

* cited by examiner

COMPUTER-IMPLEMENTED METHOD AND SYSTEM FOR OPTIMIZING A CLUSTERING OF A PLURALITY OF INPUT DATA

CROSS REFERENCE

The present application claims the benefit under 35 U.S.C. § 119 of German Patent Application No. DE 10 2024 202 027.3 filed on Mar. 5, 2024, which is expressly incorporated herein by reference in its entirety.

FIELD

The present invention relates to a computer-implemented method and/or a system for optimizing a clustering of a plurality of input data, which are preferably generated during the automatic optical inspection of at least one manufacturing component.

BACKGROUND INFORMATION

Image classification is conventional from the related art and relates to the task of extracting information from an image in order to make it possible to assign the image to a specific image category and/or image class on the basis of this information. The resulting cluster from such an image classification can be used to create, for example, thematic categories.

The classification of image data can in principle be carried out by a human analyst but is increasingly automated and carried out by machine learning approaches and/or artificial intelligence methods. In the conventional methods for classification of image data, misclassifications repeatedly occur in that images that are actually to be assigned to a specific category and/or a specific cluster are assigned to a different category by the classification algorithm, due to image-specific and/or environment-specific and/or process-specific conditions.

Automated optical inspection (AOI) is a process that uses image processing systems and machine learning to check the quality of products. This process is particularly useful in component manufacturing since it is fast, precise and cost-effective. By using AOI, the error rate can be reduced and product quality can be improved. AOI can be used in a wide variety of industry sectors.

Semiconductor manufacturing is an exemplary, fast-growing industry sector that is necessary to further advance developments in the field of automotive electrification. The global demand for powerful and complex semiconductor chips is increasing. The individual process steps are carefully controlled and errors should be detected as quickly and reliably as possible in order to minimize waste. Due to the large number of chips produced in a manufacturing plant, automated error detection during AOI is desirable, which can be supported by machine learning. Positions and/or types of errors found during different production steps of individual chips on a wafer can be represented as an image, which is called a wafer map.

This makes it possible to detect and/or classify patterns where multiple defects (possibly of the same type) were found, which form a signature on the wafer map. These patterns provide insights that can be used in the root cause analysis of defects. For example, if a line is visible at certain locations on the wafer, a device within the production process may have scratched the wafer during a production step. The production process of semiconductors is very complex and variable. New defects for which no or insufficiently labeled (image) data are available can therefore occur regularly. In addition, the identification and/or classification of defects, even with known defect patterns, is an extremely time-consuming task that can often only be carried out with the help of expert knowledge.

Several approaches for classifying error patterns are described in the related art. These include classical supervised learning approaches, transfer learning approaches using neural networks with similarity search, and more novel approaches using autoencoders. This usually requires extensive and well-coordinated training of the network architecture. In addition, the use of a specific set of known error patterns is required, which must be precisely identified or labeled.

In their scientific publication "CNN features are also great at unsupervised classification," arXiv:1707.01700, Tech. Rep., 2018. [Online]. Available: arxiv.org/abs/1707.01700, Guerin et al. analyzed a two-stage approach to clustering images. In this case, a convolutional neural network (CNN) is used as a feature extractor. Subsequently, a clustering algorithm is applied, wherein different combinations of feature extractor and clustering algorithm are investigated. In the scientific publication P. Napoletano, F. Piccoli, and R. Schettini, "*Anomaly detection in nanofibrous materials by CNN-based self-similarity,*" *Sensors*, vol. 18, no. 1, 2018, a three-stage method with application to images of nanofibrous materials is investigated. A ResNet-18 CNN is used as a feature extractor together with a principal component analysis (PCA) and a k-means clustering.

A variety of methods for performing the clustering iteratively was also investigated. For example, an iterative Gaussian mixture model (GMM) clustering method for scene images was presented in the scientific publication K. N. Doan, T. T. Do, and T. H. Le, "*Scene image clustering based on boosting and gmm,*" in *Proceedings of the Second Symposium on Information and Communication Technology*, ser. SoICT '11. New York, NY, USA: *Association for Computing Machinery,* 2011, p. 226232. [Online]. Available: doi.org/10.1145/2069216.2069258, in which the weights of the original data set are calculated iteratively. In this case, real-world scenes were evaluated along semantic axes (e.g., degree of naturalness of a scene, degree of verticality, and degree of openness), wherein predefined filters were used to extract features of the images. This method therefore cannot be adaptively applied to other use cases.

In view of the related art, which is shown here only by way of example and in part, there is still potential for optimization in order to optimize a classification and/or a clustering of images of manufacturing components, which are captured in particular during an automatic optical inspection, for defect detection.

SUMMARY

An object of the present invention is to develop a method and/or a system for clustering images of manufacturing components for the detection of component defects in such a way that, in particular, novel and/or unforeseeable defects can be assigned to a cluster, and the method and/or the system can be transferred and/or applied as adaptively as possible, in particular to other (image) data as input variables. In other words, it is an object of the present invention to specify a method and/or a system for optimizing a clustering of a plurality of input data.

The object may achieved by a computer-implemented method for optimizing a clustering of a plurality of input data according to the certain features of the present invention. The object is alternatively or additionally achieved by a system for optimizing a clustering of a plurality of input data according to certain features of the present invention.

According to an example embodiment of the present invention, a computer-implemented method for optimizing a clustering of a plurality of input data, which are preferably generated during the automatic optical inspection of at least one manufacturing component, is provided. According to an example embodiment of the present invention, the method comprises the steps of: providing S1 a plurality of input data of a manufacturing component to be inspected; extracting S2 at least one feature from the plurality of input data by applying an extraction algorithm; clustering S3 the plurality of input data on the basis of the at least one feature by applying a clustering algorithm; evaluating S4 clusters of the clustered plurality of input data by applying a cluster evaluation algorithm; sorting out S5, from the plurality of input data, input data that are assigned to at least one cluster with a high rating and/or that exceed a predetermined limit number of input data within the at least one cluster with the high rating; and repeating, in particular iteratively, steps S3 to S5 until the plurality of input data is completely clustered and/or evaluated, and/or until a predetermined termination criterion is reached.

Furthermore provided according to the present invention is a system for optimizing a clustering of a plurality of input data, which are preferably generated by an automatic optical inspection of at least one manufacturing component. According to an example embodiment of the present invention, the system comprises a provisioning device, which is designed to provide a plurality of input data of the manufacturing component to be inspected. The system furthermore comprises an evaluation and computing device, which is designed to extract at least one feature from the plurality of input data by applying an extraction algorithm; to cluster the plurality of input data on the basis of the at least one feature by applying a clustering algorithm; to evaluate the clusters of the clustered plurality of input data by applying a cluster evaluation algorithm; to sort out, from the plurality of input data, input data that are assigned to at least one cluster with a high rating and/or that exceed a predetermined limit number of input data within the at least one cluster with the high rating; and to perform at least the clustering, the evaluation and the sorting until the plurality of input data is completely clustered and/or evaluated, and/or until a predetermined termination criterion is reached. If the predetermined termination criterion is reached, it is preferred that the remaining data points are further processed manually or with another (clustering) algorithm.

The method and/or system according to the present invention can increase the accuracy of clustering input data. In addition, the method according to the present invention offers an unsupervised learning approach so that labeling of input data or training data is no longer necessary. The method according to the present invention can be carried out efficiently so that increased computing speed and reduced computing effort are achieved. The present invention also makes possible to identify, in particular automatically, data points that are difficult to cluster, since these data points remain, in particular, when the termination criterion is reached or form only very small clusters after complete clustering of the input data. By iteratively removing input data that have been assigned to a cluster with a high rating, even input data that are inherently difficult to cluster can be clustered efficiently since each iteration step "zooms in" on the plurality of input data that still need to be clustered, wherein the data points that have already been clustered are excluded. In addition, the present invention makes faster identification of, in particular, new types of errors possible. According to the present invention, a reduction in manufacturing component waste can also be achieved since less time is required for error detection. Particularly preferably, the input data from the cluster are assigned to exactly one cluster. This cluster with the "highest rating" is preferably sorted out. The limit number preferably only becomes relevant at the end of a method sequence, in particular when the iterative method is completed and/or the individual clusters are sorted, for example into a category "large enough" or into a category "too small." The data points from the clusters in the category "too small" are preferably assigned to the clusters in the category "large enough" by means of a neural network.

According to an example embodiment of the present invention, a computer-implemented approach is provided, which preferably does not require expert knowledge regarding the input data to be analyzed and is in particular flexible for new and/or unknown error patterns. According to the present invention, no complex training structure is required. The method according to the present invention for the optimized clustering of input data is particularly preferably used for the optimized clustering of defect patterns on wafer maps in the field of semiconductor component manufacturing. The method according to the present invention is preferably completely unsupervised.

A wafer map is preferably a visual tool used to represent data on a semiconductor wafer (e.g., a silicon wafer). A wafer is preferably a thin slice of semiconductor material on which integrated circuits are produced. A wafer map preferably shows a position and/or quality of individual chips on a wafer. Each chip is preferably represented by a specific color and/or a symbol that indicates its performance data (e.g., voltage, current intensity) and/or its test status (e.g., good, poor). The wafer map preferably makes it possible to quickly detect problems with individual chips and understand their distribution on the wafer. Wafer maps are preferably used in semiconductor manufacturing to monitor and/or improve the performance and quality of the chips on a wafer. They are a preferred component of process control and/or process characterization and preferably contribute to increasing the efficiency and/or quality of semiconductor manufacturing.

The method according to the present invention preferably uses a cluster evaluation algorithm, such as a silhouette metric, to evaluate individual clusters. The method according to the present invention is preferably used for clustering a real-world industrial wafer map data set. The results of the method according to the present invention can, for example, be compared with a data set containing expert labels for known, recurring defect patterns. In comparison to a non-iterative method of the related art, the method according to the present invention can form more homogeneous clusters. This makes pre-sorting of defects of (semiconductor) manufacturing components possible without the need for prior knowledge and/or the effort to label a data set and train a supervised classifier. The method according to the present invention can thus be used to obtain information about the different defect patterns in a wafer map data set and/or to use the clustering result as a first recommendation for manual labeling. It is also possible according to the present invention to identify subclasses within wafer map data sets that have been identified and/or labeled by experts as one of the known classes.

The method according to an example embodiment of the present invention substantially comprises three steps: feature extraction, for example by means of a pre-trained convolutional neural network (CNN) together with a dimension reduction, for example by means of PCA, and a clustering, for example by means of active clustering (AC).

For unsupervised clustering of input image data, the use of features from a pre-trained CNN is preferred since this pre-trained CNN provides an abstract representation of images. The use of CNNs as a feature extraction method has also proven to be very effective in many pattern recognition applications, in particular in the field of semiconductor component manufacturing. According to an example embodiment of the present invention, preferably visually detectable components of a wafer map as input data are detected and can preferably be represented as a feature vector. Using a CNN as a feature extractor preferably provides a large number of abstract features that are useful for image classification. Subsequently, in a preferred embodiment of the present invention, the initially high number of (feature) dimensions is reduced, preferably by carrying out a principal component analysis (PCA) in order to identify the features that are responsible for the greatest variance in the data set. Preferably, some, in particular freely selectable, parameters can be set for the dimension reduction. These parameters can preferably be set in a data-set-dependent and/or problem-specific manner. The dimension reduction method itself is preferably merely a component or a preferred sub-step within the clustering method according to the present invention.

Within the meaning of the present disclosure, the term "plurality" is to be understood as multiple items of image data. In other words, the wording "a plurality of image data" is to be understood as meaning at least two image data items.

It is understood that the steps according to the present invention as well as other optional steps do not necessarily have to be carried out in the order shown, but can also be carried out in a different order. Other intermediate steps can also be provided. The individual steps can also comprise one or more sub-steps without departing from the scope of the method according to the present invention.

In a preferred embodiment of the present invention, the extraction algorithm comprises a deep neural network, preferably an autoencoder, and/or an, in particular pre-trained, convolutional neural network, in particular in combination with a PCA, and/or an autoencoder in combination with a PCA, and/or a supervised, preferably pre-trained, convolutional neural network. For example, an autoencoder, preferably without PCA, can be used for feature extraction. The autoencoder can be retrained on the basis of a reduced data set after each iteration step. The autoencoder can thus function as a feature extractor. Furthermore, a deep neural network with a dimension reduction function can be used. The use of a pre-trained convolutional neural network (CNN) is particularly preferred. This has the advantage that CNN features are always identical per data point and per iteration step and therefore do not always have to be recalculated. This makes the application of a CNN computationally efficient. In addition, as is conventional, a CNN can be supplemented with dimension reduction metrics, wherein the fast and efficient PCA is a suitable option for this purpose. A combination of an autoencoder and a PCA may also be preferred. The use of a supervised learning approach, for example a supervised pre-trained CNN with supporting dimension reduction, may also be preferred. The CNN is preferably trained on the basis of labeled input data and/or by solving an auxiliary classifier problem (transfer learning). Furthermore, alternatively, it is also possible to use only a dimension reduction for feature extraction.

Autoencoders are a type of artificial neural network used to compress and reproduce data. They consist of two main parts: an encoder that transforms the input data into a compressed coding space, and a decoder that reproduces the compressed data back into their original form. There are different types of autoencoders, such as the simple autoencoder, the convolutional autoencoder, the variational autoencoder and the generative adversarial autoencoder.

Principal component analysis (PCA) is a statistical method used to detect the structure of complex data. It is used to reduce the dimensions of the data without losing important information. PCA is mainly used to transform data into a smaller set of new variables called principal components, which may have a larger variance than the original variables. Preferably, a relatively large portion of the variance is represented by relatively few variables. The PCA therefore uses a number of features to be analyzed that is smaller than the number of features to be originally examined, in order to obtain residuals that enable a statement to be made about an anomaly in the semiconductor component to be examined. An inverse PCA may be used to reconstruct data. It is then ascertained whether and where reconstruction errors are particularly high in relation to output data, in order to draw conclusions about an anomaly. Preferably, a back calculation is carried out via the feature extractor in order to represent anomalies in the original domain.

In a preferred embodiment of the present invention, the clustering algorithm comprises a GMM algorithm and/or an AC algorithm and/or a DBSCAN algorithm and/or a k-means algorithm. In principle, however, any type of clustering algorithm is conceivable; the algorithms mentioned above are therefore only examples.

GMM stands for Gaussian mixture modeling and is a data cluster analysis method. It is one of the supervised learning methods and is used to divide data points into homogeneous groups or clusters. In contrast to other clustering methods, such as k-means clustering, GMM assumes that the data points come from multiple Gaussian distributions. Each of these distributions or a combination of individual distributions represents a cluster. Particularly preferably, a value of the probability density function can be determined directly from the GMM model. Alternatively, the GMM preferably uses an estimation method to calculate the probability of each data point belonging to a particular cluster. By optimizing the parameters of the Gaussian distributions and the probabilities, the GMM can then detect the cluster structure in the data. GMM is particularly suitable for data sets where the clusters are not clearly defined or where the clusters have a non-spherical shape. It is also well suited for data sets with an overlapping structure, where a data point can be part of multiple clusters.

AC clustering is an abbreviation for "agglomerative clustering." This is a hierarchical clustering analysis method used for unsupervised learning. In contrast to other clustering methods, such as k-means clustering, agglomerative clustering starts with each data point as a separate cluster and then gradually connects neighboring clusters until only a few large clusters remain. This process preferably continues until only a single large cluster that encompasses the entire data set remains. AC clustering is easy to implement and is well suited for data sets with a complex cluster structure.

DBSCAN stands for density-based spatial clustering of applications with noise and is a data cluster analysis method used for unsupervised learning. DBSCAN is a method in which data points are grouped into a cluster if they are close to one another and have a certain minimum number of neighbors. It can automatically detect the number of clusters and is therefore particularly suitable for data sets with complex cluster structures. The method preferably works by searching the data set for high-density points and then forming clusters around these points. Points that are not part of a cluster are preferably referred to as noise. DBSCAN is a versatile algorithm and is well suited for data sets with clusters that do not have a spherical shape, as well as for data sets with an overlapping structure, where a data point can be part of multiple clusters.

In a preferred embodiment of the present invention, the cluster evaluation algorithm comprises a silhouette coefficient metric or silhouette metric and/or another distance metric. The silhouette metric is used mainly to determine the number of clusters and generally to compare different clustering results. From the related art, it is currently unknown to use the silhouette metric for automation in an iterative clustering method.

The silhouette coefficient is a metric that is preferably used to evaluate the quality of a clustering. The idea behind it is to measure, for each data point, the similarity to its neighbors within the same cluster and preferably compare it with the similarity to neighbors in neighboring clusters. The silhouette coefficient for a given data point is preferably calculated as follows: calculating an average similarity (e.g., using a distance metric) between a data point and all other points within the same cluster; calculating an average similarity between the data point and all points in the nearest neighbor cluster; calculating a silhouette coefficient for the data point by dividing a difference between the average similarity within the cluster and the average similarity to neighboring clusters by the larger of the two. The silhouette coefficient can preferably take a value between −1 and 1. A value of 1 preferably means that the data point fits very well to its cluster and fits very poorly to neighboring clusters. A value of −1 preferably means that the data point fits better to a neighboring cluster than to its own cluster. A value of 0 preferably means that the data point fits equally well to its own cluster and to neighboring clusters. The average silhouette coefficient for all data points of a cluster can be used to evaluate the quality of the overall clustering. A higher average silhouette coefficient preferably means better clustering.

Distance metrics can be: Euclidean distance: This is the most commonly used distance metric and is calculated by taking the square root of the sum of the squared differences of two points. Manhattan distance: This distance is calculated by calculating the sum of the absolute differences between two points. Chebyshev distance: This distance is calculated by calculating the largest absolute difference between two points. Minkowski distance: This is a more general form of distance metric that includes both the Euclidean distance and the Manhattan distance. Hamming distance: This distance is used to measure the similarity of two binary vectors and calculates the number of positions where the two vectors are different. Jaccard distance: This distance is used to measure the similarity of two nominal or categorial features and calculates the ratio of the number of common features to the number of different features. Mahalanobis distance: This distance takes into account the covariance of the features and can be used to measure the similarity of two multivariate data points. It should be noted that the choice of distance metric depends on the specific requirements of the problem and that the use of a particular distance metric can influence the result of a data cluster analysis.

In a preferred embodiment of the present invention, the predetermined termination criterion comprises a minimum number of input data and/or of features within a cluster. Other termination criteria are also possible.

In a preferred embodiment of the present invention, the plurality of input data comprises RGB image data and/or gray-scale image data and/or image-depth-related image data and/or multispectral image data and/or time series data and/or process curves in which, in particular, physical quantities are plotted over one another (e.g., force over displacement, which, in contrast to time series, are preferably not dependent on time). In other words, any input data set can be clustered according to the present invention, wherein a data set generated during an automatic and/or automated optical inspection is preferred. The method according to the present invention can preferably also be adapted to other high-dimensional data sources.

In a preferred embodiment of the present invention, the plurality of input data is captured by at least one imaging sensor, in particular a camera and/or a multi-camera and/or an ultrasonic sensor and/or a lidar sensor and/or an infrared sensor.

In a preferred embodiment of the present invention, after the step of extracting S2, a reduction S2' of the dimensionality is carried out by applying a dimensionality reduction algorithm, in particular a PCA and/or an autoencoder. Particularly preferably, the step of reducing the dimensionality of the extracted features during the repetition step S6 is also repeated in each iterative loop.

In a preferred embodiment of the present invention, a computer-implemented method for checking a clustering result, which was generated by a machine learning algorithm, for a plurality of input data to be checked is proposed. The plurality of input data to be checked is clustered on the basis of the method according to the present invention according to one of its embodiments in order to thus provide a check result, which is compared with the clustering result. The method according to the present invention can thus also be used to check classification results of a supervised and/or alternative clustering approach since it is possible according to the present invention to gradually sort even input data that are difficult to cluster into a suitable cluster on the basis of iteration and/or refinement of the input data by hiding data that are already clustered well. In addition, due to the iterative approach, the method according to the present invention provides an indication of an underlying class and/or clustering logic.

According to the present invention, a computer program having program code is also provided to carry out at least parts of the method according to the present invention in any of its embodiments when the computer program is executed on a computer.

In other words, according to the present invention, a computer program (product) comprising commands that, when the program is executed by a computer, cause the computer to carry out the method/steps of the method according to the present invention in any of its embodiments.

According to the present invention, a computer-readable data carrier having program code of a computer program is provided to carry out at least parts of the method according to the present invention in any of its embodiments when the computer program is executed on a computer. In other words, the present invention relates to a computer-readable (memory) medium comprising commands that, when executed by a computer, cause the computer to carry out the method/steps of the method according to the present invention in any of its embodiments.

The described embodiments and developments of the present invention can be combined with one another as desired.

Further possible embodiments, developments and implementations of the present invention also include combinations not explicitly mentioned of features of the present invention described above or in the following relating to the exemplary embodiments.

BRIEF DESCRIPTION OF THE DRAWINGS

The figures are intended to impart further understanding of the embodiments of the present invention. They illustrate embodiments and, in connection with the description, serve to explain principles and concepts of the present invention.

Other embodiments and many of the mentioned advantages are apparent from the figures. The illustrated elements of the figures are not necessarily shown to scale relative to one another.

DETAILED DESCRIPTION OF EXAMPLE EMBODIMENTS

In the figures, identical reference signs denote identical or functionally identical elements, parts or components, unless stated otherwise.

Figure 1:
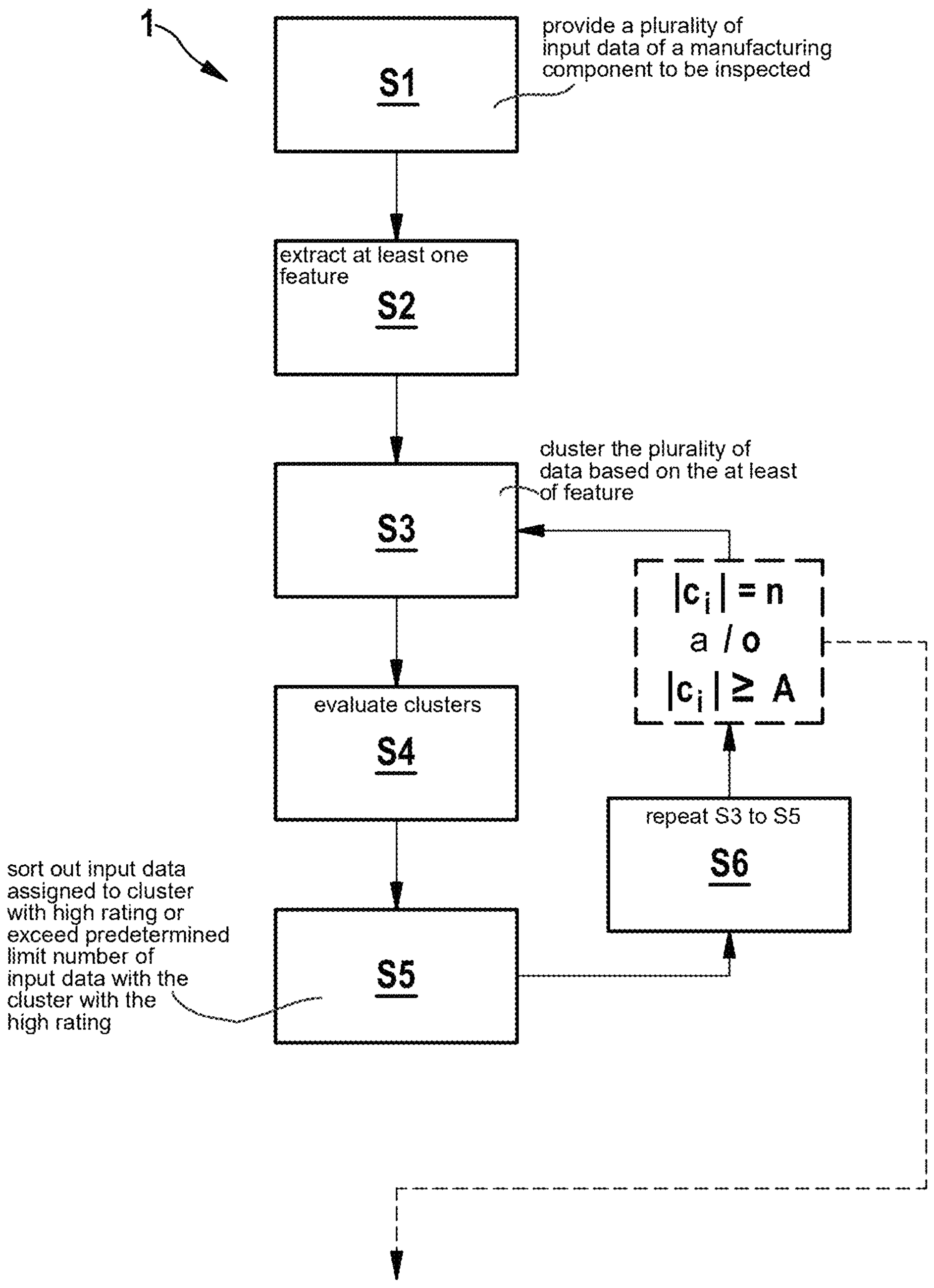
FIG. 1 shows a schematic flow chart of an exemplary embodiment of the method according to the present invention.

FIG. 1 shows a schematic flow chart of a computer-implemented method for optimizing a clustering of a plurality of input data, which are preferably generated during the automatic optical inspection of at least one manufacturing component.

In any embodiment, the method can be carried out at least in part by a system 1, which for this purpose can comprise a plurality of components not shown in more detail, for example one or more provisioning devices and/or at least one evaluation and computing device. It is self-evident that the provisioning device can be designed together with the evaluation and computing device, or can be different therefrom. Furthermore, the system can comprise a storage device and/or an output device and/or a display device and/or an input device.

According to an example embodiment of the present invention, the computer-implemented method comprises at least the following steps:

In a step S1, a plurality of input data of a manufacturing component to be inspected is provided.

In a step S2, at least one feature is extracted from the plurality of input data by applying an extraction algorithm.

In a step S3, the plurality of input data is clustered on the basis of the at least one feature by applying a clustering algorithm.

In a step S4, clusters of the clustered plurality of input data are evaluated by applying a cluster evaluation algorithm.

In a step S5, input data that are assigned to at least one cluster with a high rating and/or that exceed a predetermined limit number of input data within the at least one cluster with the high rating are sorted out from the plurality of input data.

In a step S6, steps S3 to S5 are repeated, in particular iteratively, until the plurality of input data n is completely clustered and/or evaluated ($|C_i|=n$), and/or until a predetermined termination criterion A is reached. Here, $C_i$ describes the power of the cluster i, wherein the calculation is preferably carried out for all i clusters.

Figure 2:
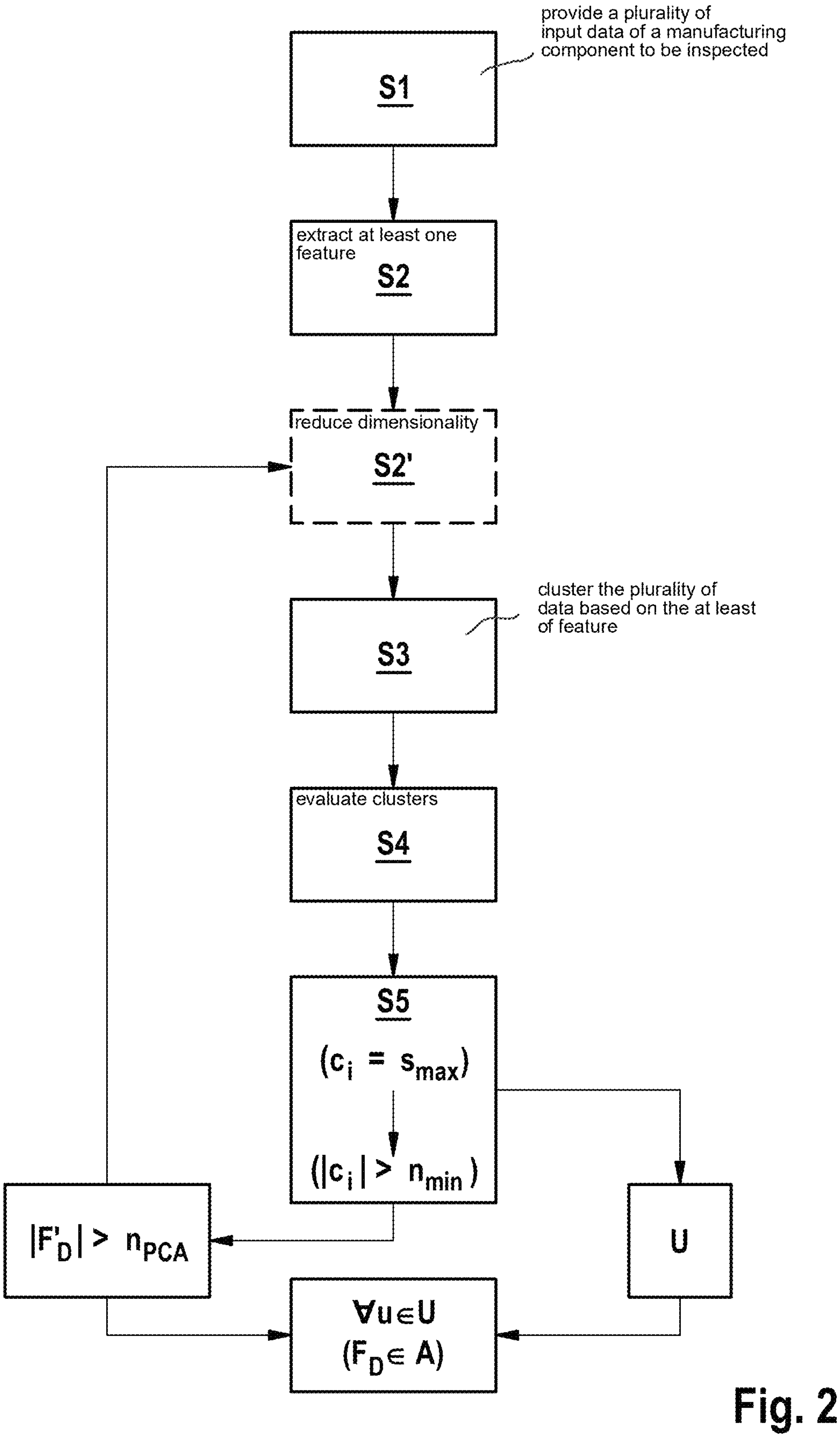
FIG. 2 shows a schematic flow chart of an exemplary embodiment of the method according to the present invention.

FIG. 2 shows a further schematic flow chart of an embodiment of the method according to the present invention.

In contrast to FIG. 1, according to FIG. 2, a further step S2' is carried out after step S2. In step S2', the dimensionality of the plurality of input data and/or of the features extracted therefrom is reduced by applying a dimensionality reduction algorithm, in particular a PCA and/or an autoencoder.

In step S5, according to FIG. 2, an advantageous check is carried out explicitly to determine which cluster is the cluster with the highest rating $S_{max}$. Furthermore, it is advantageously checked whether the cluster with the highest rating $S_{max}$ also comprises a predetermined minimum number $n_{min}$ of data points or input data. If the query for the predetermined minimum number $n_{min}$ shows that it is not reached, the associated input data remain in the data set of the plurality of input data to be clustered and/or are transferred to a further data set U. If the query for the predetermined minimum number $n_{min}$ shows that it is reached, the data for this cluster are removed from the data set to be clustered, so that a reduced feature vector $F'_D$ is generated.

On the basis of the reduced feature vector $F'_D$, it is preferably checked whether a number of remaining features $|F'_D|$ in the reduced feature vector $F'_D$ is greater than a limit number $n_{PCA}$ of the dimensionality reduction algorithm. If the number of remaining features $|F'_D|$ is greater than the limit number $n_{PCA}$, steps S2' to S5 are preferably repeated iteratively. If the number of remaining features $|F'_D|$ is not greater than the limit number $n_{PCA}$, the underlying input data are preferably assigned to the data set U. The data set U is preferably assigned to a cluster of nearest neighbors (preferably ascertained using the k-nearest neighbor method).

The iterative process flow, as shown in FIG. 2, preferably proceeds in detail as follows: First, the described three-stage clustering method is carried out. In a first step, the feature vectors $F_D$ are extracted, for example, by an Xception CNN for all input data, e.g., all wafer maps, in a data set D. Subsequently, a dimension reduction (e.g., PCA) and a clustering (e.g., AC) are preferably carried out. After the wafer maps have been sorted into clusters, the clusters are preferably evaluated using a silhouette metric. The metric preferably compares a data point with all other data points of the resulting cluster and calculates the distance to the nearest cluster. This metric therefore gives a high rating to dense clusters that are far away from other clusters. Possible values for the silhouette metric range from −1 to 1. For the cluster with the highest silhouette value, it can be assumed that the wafer maps in this cluster have the highest separability in comparison to the rest of the data set and at the same time a high similarity within the cluster. If the number of wafer maps in this cluster is greater than the minimum $n_{min}$, the cluster is preferably excluded and stacked or placed next to the result data set of the assigned wafer maps A. If the cluster is small ($|C_i|<n_{min}$), it is preferably not counted as a "good" cluster, but is stacked next to D to form a data set of unassigned input data or wafer maps U and is preferably not considered further until the end of the iterations according to the present invention. The number of required wafer maps $n_{min}$ in a cluster can preferably be adjusted depending on an underlying use case and/or the definition of the minimum size of a cluster. If the stopping criterion $|F'_D|<n_{PCA}$ of the iterations is met, the remaining input data or wafer maps are preferably assigned to the data set U. At this point in the method, the data set D is preferably split into two data sets. Data set A preferably comprises all input data or wafer maps that are sorted into specific clusters ascertained by the iterative process. The data set U preferably comprises certain input data or wafer maps whose number was classified as too small by the iterative process.

At the end of the iterative method according to the present invention, all input data or wafer maps in the data set U are preferably assigned to an identified cluster of the data set A. This can be done, for example, by searching for and assigning a nearest neighbor in the CNN feature vector space of $F_D \in A$. It should be noted that the search for the nearest neighbor takes place in the CNN feature vector space and not in the PCA space, where the components and thus the distances may change from iteration to iteration.

This final assignment, which is done after iteratively filtering out good clusters of sufficient size, makes it possible to assign each input file or wafer map to a cluster while preventing the number of resulting clusters from becoming too large and having very few input data or wafer maps in some clusters. This final assignment of input data or wafer maps of the data set U that ended up in clusters that are too small does not necessarily have to be carried out. Depending on the application of the proposed iterative clustering method, it can be decided separately whether the wafer maps of U are assigned to certain clusters or not. For example, if it is more important to find relevant pure clusters, this final assignment may not be desired.

The main concept of this iterative clustering method is to make PCA in particular possible for different variances within the CNN feature vectors. The visual appearance of error classes in wafer maps can vary. There are therefore error classes that are expected to be clearly separated by means of PCA and those for which PCA may not readily achieve separation as long as there are error classes in the data set that make clear separation of the principal components possible. By iteratively removing input data or wafer maps that have already been clustered into good clusters and by repeatedly reinitializing the PCA on the shrunken data set, it is achieved that variances in the CNN feature space that were not captured in the first iterations can be analyzed. In this way, corresponding smaller or different variances in the data set can be mapped to the principal components, which somewhat loosens up very closely spaced class distributions and thus simplifies clustering.

In the iterative clustering method presented, there are preferably certain hyperparameters that can be adjusted depending on the data set and application case. These are, by way of example, the choice of the CNN network architecture, the dimension reduction method and/or the clustering method, and the choice of the distance metric. The freely selectable parameters for the method according to the present invention are, for example, a number of allowed principal components ($n_{PCA}$), a number of allowed clusters per iteration ($n_c$), and/or a minimum number from which a formed cluster is considered large enough ($n_{min}$).

What is claimed is:

1. A computer-implemented method for inspecting a manufacturing component, the method comprising the following steps:

capturing, by an imaging sensor system comprising one or more imaging sensors, a plurality of images representing the manufacturing component to be inspected, the plurality of images forming a dataset;

extracting, by a computing device that includes at least one processor and for each respective one of the plurality of images, a respective multi-dimensional numerical feature vector comprising a plurality of numerical components that represent features of the respective image in a latent feature space, thereby forming a plurality of feature vectors;

reducing, by the computing device, a dimensionality of the plurality of feature vectors by:

computing from the plurality of feature vectors a dimensionality-reduction transformation that maps the feature vectors into a reduced-dimension feature space whose dimensionality is lower than a dimensionality of the latent feature space; and applying the dimensionality-reduction transformation to the feature vectors, thereby generating, for respective ones of the plurality of images, reduced-dimension feature representations that have fewer numerical components than the extracted plurality of feature vectors;

clustering, by the computing device and in the reduced-dimension feature space, the reduced-dimension feature representations via a clustering algorithm that groups unlabeled data based on inter-data similarity, so as to obtain a plurality of clusters, each cluster including reduced-dimension feature representations corresponding to respective ones of the plurality of images;

evaluating, by the computing device for each of the plurality of clusters, a cluster-quality metric based on distances among the reduced-dimension feature representations assigned to that cluster, the cluster-quality metric indicating a quality of clustering of the respective cluster;

performing sorting by removing, from the dataset for subsequent processing, the images whose reduced-dimension feature representations are assigned to at least one of the clusters whose respective cluster-quality metric is determined, according to a predefined comparison rule, to exceed the cluster-quality metrics of one or more other ones of the clusters;

iteratively repeating, by the computing device, the dimensionality-reduction, clustering, evaluating, and sorting steps, each iteration, subsequent to a first one of the iterations, being performed exclusively for remaining, unsorted images of the dataset obtained after a preceding one of the sorting steps, (i) until all of the plurality of images are clustered or (ii) until a predetermined termination condition is satisfied; and providing, by the computing device and based on one or more clusters to which the reduced-dimension feature representations corresponding to the images are assigned after completion of all of the iterations, an inspection output indicating a defect classification or inspection status for the manufacturing component represented by the images.

2. The computer-implemented method according to claim 1, wherein the extracting includes applying a deep neural network including an autoencoder, and/or a pre-trained convolutional neural network in combination with a Principal Component Analysis (PCA), and/or an autoencoder in combination with the PCA, and/or a supervised pre-trained convolutional neural network.

3. The computer-implemented method according to claim 1, wherein the clustering algorithm includes a Gaussian mixture model (GMM) algorithm and/or an agglomerative clustering (AC) algorithm and/or a density-based spatial clustering of applications with noise (DBSCAN) algorithm.

4. The computer-implemented method according to claim 1, wherein the cluster-quality metric includes a silhouette coefficient metric and/or another distance metric.

5. The computer-implemented method according to claim 1, wherein the predetermined termination condition includes reaching a minimum number of reduced-dimension feature representations.

6. The computer-implemented method according to claim 1, wherein the plurality of images include RGB image data and/or gray-scale image data and/or image-depth-related image data and/or multispectral image data and/or images representing time series data and/or images representing process curves.

7. The computer-implemented method according to claim 1, wherein the imaging sensor system includes: a camera and/or a multi-camera and/or an ultrasonic sensor and/or a lidar sensor and/or an infrared sensor.

8. The computer-implemented method according to claim 1, wherein a dimensionality-reduction algorithm used for computing the dimensionality-reduction transformation includes a Principal Component Analysis (PCA) and/or an autoencoder.

9. A computer-implemented method for checking a clustering result generated by a machine-learning algorithm for a plurality of input data to be checked, the method comprising the following steps:

capturing, by an imaging sensor system comprising one or more imaging sensors, a plurality of images representing a manufacturing component associated with the plurality of input data to be checked, the plurality of images forming a dataset to be checked;

extracting, by a computing device that includes at least one processor and for each respective one of the plurality of images, a respective multi-dimensional numerical feature vector comprising a plurality of numerical components that represent features of the respective image in a latent feature space, thereby forming a plurality of feature vectors;

reducing, by the computing device, a dimensionality of the plurality of feature vectors by:

computing from the plurality of feature vectors a dimensionality-reduction transformation that maps the feature vectors into a reduced-dimension feature space whose dimensionality is lower than a dimensionality of the latent feature space; and applying the dimensionality-reduction transformation to the feature vectors, thereby generating, for respective ones of the plurality of images, reduced-dimension feature representations that have fewer numerical components than the extracted plurality of feature vectors;

clustering, by the computing device and in the reduced-dimension feature space, the reduced-dimension feature representations via a clustering algorithm that groups unlabeled data based on inter-data similarity, so as to obtain a check result comprising a plurality of clusters, each cluster including reduced-dimension feature representations corresponding to respective ones of the plurality of images;

evaluating, by the computing device for each of the plurality of clusters of the check result, a cluster-quality metric based on distances among the reduced-dimension feature representations assigned to that cluster, the cluster-quality metric indicating a quality of clustering of the respective cluster;

performing sorting by removing, from the dataset for subsequent processing, the images whose reduced-dimension feature representations are assigned to at least one of the clusters whose respective cluster-quality metric is determined, according to a predefined comparison rule, to exceed the cluster-quality metrics of one or more other ones of the clusters;

iteratively repeating, by the computing device, the dimensionality-reduction, clustering, evaluating, and sorting steps, each iteration, subsequent to a first one of the iterations, being performed exclusively for remaining, unsorted images of the dataset obtained after a preceding one of the sorting steps, (i) until all of the plurality of images are clustered or (ii) until a predetermined termination condition is satisfied; and comparing, by the computing device, the check result obtained from the iteratively repeated clustering with the clustering result generated by the machine-learning algorithm, to determine whether the clustering result generated by the machine-learning algorithm is valid for the plurality of input data to be checked.

10. A system for inspecting a manufacturing component, the system comprising:

an imaging sensor system, wherein the imaging sensor system is configured to capture a plurality of images representing the manufacturing component to be inspected, the plurality of images forming a dataset; and a computing device that includes at least one processor, wherein the computing device is configured to:

extract, for each respective one of the plurality of images, a respective multi-dimensional numerical feature vector comprising a plurality of numerical components that represent features of the respective image in a latent feature space, thereby forming a plurality of feature vectors;

reduce a dimensionality of the plurality of feature vectors by:

computing from the plurality of feature vectors a dimensionality-reduction transformation that maps the feature vectors into a reduced-dimension feature space whose dimensionality is lower than a dimensionality of the latent feature space; and applying the dimensionality-reduction transformation to the feature vectors, thereby generating, for respective ones of the plurality of images, reduced-dimension feature representations that have fewer numerical components than the extracted plurality of feature vectors;

cluster, in the reduced-dimension feature space, the reduced-dimension feature representations via a clustering algorithm that groups unlabeled data based on inter-data similarity, so as to obtain a plurality of clusters, each cluster including reduced-dimension feature representations corresponding to respective ones of the plurality of images;

evaluate, for each of the plurality of clusters, a cluster-quality metric based on distances among the reduced-dimension feature representations assigned to that cluster, the cluster-quality metric indicating a quality of clustering of the respective cluster;

perform sorting by removing, from the dataset for subsequent processing, the images whose reduced-dimension feature representations are assigned to at least one of the clusters whose respective cluster-quality metric is determined, according to a predefined comparison rule, to exceed the cluster-quality metrics of one or more other ones of the clusters;

iteratively repeat the dimensionality-reduction, clustering, evaluating, and sorting, wherein each iteration, subsequent to a first one of the iterations, is performed exclusively for remaining, unsorted images of the dataset obtained after a preceding one of the sorting steps, until all of the plurality of images are clustered or until a predetermined termination condition is satisfied; and provide, based on one or more clusters to which the reduced-dimension feature representations corresponding to the images are assigned after completion of all of the iterations, an inspection output indicating a defect classification or inspection status for the manufacturing component represented by the images.

11. A non-transitory computer-readable data carrier on which are stored program code of a computer program for inspecting a manufacturing component, the program code being executable by a computer and, when executed by the computer, causing the computer to perform the following steps:

capturing, by an imaging sensor system comprising one or more imaging sensors, a plurality of images representing the manufacturing component to be inspected, the plurality of images forming a dataset;

extracting, by a computing device that includes at least one processor and for each respective one of the plurality of images, a respective multi-dimensional numerical feature vector comprising a plurality of numerical components that represent ing features of the respective image in a latent feature space, thereby forming a plurality of feature vectors;

reducing, by the computing device, a dimensionality of the plurality of feature vectors by:

computing from the plurality of feature vectors a dimensionality-reduction transformation that maps the feature vectors into a reduced-dimension feature space whose dimensionality is lower than a dimensionality of the latent feature space; and applying the dimensionality-reduction transformation to the feature vectors, thereby generating, for respective ones of the plurality of images, reduced-dimension feature representations that have fewer numerical components than the extracted plurality of feature vectors;

clustering, by the computing device and in the reduced-dimension feature space, the reduced-dimension feature representations via a clustering algorithm that groups unlabeled data based on inter-data similarity, so as to obtain a plurality of clusters, each cluster including reduced-dimension feature representations corresponding to respective ones of the plurality of images;

evaluating, by the computing device for each of the plurality of clusters, a cluster-quality metric based on distances among the reduced-dimension feature representations assigned to that cluster, the cluster-quality metric indicating a quality of clustering of the respective cluster;

performing sorting by removing, from the dataset for subsequent processing, the images whose reduced-dimension feature representations are assigned to at least one of the clusters whose respective cluster-quality metric is determined, according to a predefined comparison rule, to exceed the cluster-quality metrics of one or more other ones of the clusters;

iteratively repeating, by the computing device, the dimensionality-reduction, clustering, evaluating, and sorting steps, each iteration, subsequent to a first one of the iterations, being performed exclusively for remaining, unsorted images of the dataset obtained after a preceding one of the sorting steps, (i) until all of the plurality of images are clustered or (ii) until a predetermined termination condition is satisfied; and providing, by the computing device and based on one or more clusters to which the reduced-dimension feature representations corresponding to the images are assigned after completion of all of the iterations, an inspection output indicating a defect classification or inspection status for the manufacturing component represented by the images.

12. The computer-implemented method according to claim 1, further comprising:

after completion of all of the iterations of the dimensionality-reduction, clustering, evaluating, and sorting steps, assigning any remaining images whose reduced-dimension feature representations were not assigned to a cluster during the iterative clustering to a respective one of the plurality of clusters based on a neighboring-cluster criterion, wherein the neighboring-cluster criterion includes determining, for each remaining image, a distance between its reduced-dimension feature representation and one or more reduced-dimension feature representations of images assigned to each cluster, the remaining image being assigned to the cluster having the smallest such distance.

* * * * *